United States Patent
Woock

(10) Patent No.: US 6,177,043 B1
(45) Date of Patent: Jan. 23, 2001

(54) METHOD FOR PRODUCING FLEXIBLE DECOYS

(76) Inventor: Laverne E. Woock, 28179 Temple Ave., Shell Rock, IA (US) 50670

(*) Notice: Under 35 U.S.C. 154(b), the term of this patent shall be extended for 0 days.

(21) Appl. No.: 08/986,615

(22) Filed: Dec. 8, 1997

(51) Int. Cl.⁷ .................................................. B29C 49/04
(52) U.S. Cl. .......................................... 264/540; 264/523
(58) Field of Search ...................... 264/506, 540, 264/523

(56) References Cited

U.S. PATENT DOCUMENTS

| | | | | |
|---|---|---|---|---|
| 3,608,268 | * | 9/1971 | Lauritzen | 264/506 |
| 4,079,111 | * | 3/1978 | Uhlig | 264/506 |
| 5,172,507 | * | 12/1992 | Franceshini | 43/3 |
| 5,174,458 | * | 12/1992 | Segati | 220/666 |
| 5,206,037 | * | 4/1993 | Robbins, III | 264/534 |
| 5,573,129 | * | 11/1996 | Nagata et al. | 220/666 |

OTHER PUBLICATIONS

UC Researchers Smach 0.915 PE Density Mark, Plastics World, pp. 8–9, Oct, 1984.*

* cited by examiner

*Primary Examiner*—Jan H. Silbaugh
*Assistant Examiner*—Suzanne E. McDowell
(74) *Attorney, Agent, or Firm*—James C. Nemmers

(57) ABSTRACT

An improved method for producing collapsible, foldable decoys by using blow molding techniques with certain plastic compositions that result in a greatly improved decoy. The invention employs a conventional blow molding process and uses polyolefin resins commonly known as very low density polyethylene or ultra low density polyethylene resins.

3 Claims, No Drawings

METHOD FOR PRODUCING FLEXIBLE DECOYS

BACKGROUND OF THE INVENTION

Hunters of game, including waterfowl, commonly use decoys to attract the game to the proximity of the hunter. Decoys for all types of game and waterfowl have been commercially produced for many years in a variety of types and forms. Many such decoys are rigid replicas of the game being hunted. The more realistic appearing the decoy, the more effective it is. Decoys are commonly made from a variety of materials, primarily plastic, and they are commonly made in rigid or semi-rigid form. However, depending on the type of game being hunted, the decoys can be quite bulky and occupy a considerable amount of space while the hunters are traveling to the remote locations where they are going to hunt. Therefore, in recent years some decoys have been made of flexible material so that they can be collapsed and folded so as to occupy less space. An example of such flexible foldable decoys produced by a vacuum forming process is shown in Remus U.S. Pat. No. 4,821,444. These flexible decoys, when unfolded and expanded, provide a quite realistic three-dimensional decoy. At the present time, the only known process for producing these flexible decoys is to produce them by a vacuum forming process in which a flexible, closed cell expanded foam, such a polyethylene is used. This allows the figure of the decoy to regain its shape after storage and during use, thus producing a somewhat realistic decoy. However, decoys produced by a vacuum forming process are relatively expensive to produce, are subject to becoming torn if not carefully handled, and are limited in the degree of detailed realism that can be obtained at a reasonable cost.

There is therefore a need for an improved flexible and collapsible decoy that is stronger and more durable, more realistic and which can be produced at a lower cost. Although there have been suggestions of producing these decoys using a blow molding process, all attempts to date have been unsuccessful in producing a satisfactory commercially acceptable product.

SUMMARY OF THE INVENTION

The invention provides an improved method for producing collapsible, foldable decoys by using blow molding techniques with certain plastic compositions that result in a greatly improved decoy. The invention employs a conventional blow molding process and uses polyolefin resins which are known in the industry as very low density polyethylene or ultra low density polyethylene resins. The resins used are those with certain specified densities and melt indices as more fully set forth in the detailed description set forth hereinafter.

DESCRIPTION OF THE PREFERRED EMBODIMENT OF THE INVENTION

The invention utilizes the basic principles of the standard and well known, blow molding process. Blow molding techniques are commonly used for producing rigid and semi-rigid products of a variety of types, such as fluid containers, but their successful use in producing hollow products that are flexible and collapsible and which will regain their shape when expanded have been largely unsuccessful. I have discovered, however, that if certain resin materials are used, high quality, flexible products can be produced using blow molding techniques.

As is well known to those skilled in the art, the blow molding process utilizes a two piece mold containing mold cavities having the configuration of the product to be produced. The cavities in each of the two mold parts are generally symmetrical but they need not be, depending upon the product being formed. The mold is maintained at a preselected temperature, such as 60° F., by circulating a liquid coolant, such as water, around the mold. The desired mixture of the material to be used in producing the product is prepared, usually by mixing beads of thermoplastic material, color additives, regrind, etc. The material mixture is then heated to a suitable temperature, such as 400° F., until the mixture is in a liquid state. The heated liquid mixture is then extruded through a die to form a hollow tube called a parison. The mold subsequently closes around the parison. Simultaneously, air is injected into the parison to force the material into the mold cavities. Since the mold is being continuously cooled, the material will solidify to form the product. When the product is sufficiently cooled, it is removed from the mold and the flashing cut off and reground for reprocessing.

The blow molding process is used extensively to produce all types of rigid, hollow plastic objects, such as plastic gasoline containers, milk jugs, etc. Blow molding has rarely been successfully used to produce a flexible and collapsible product that can return to its original shape after being folded or collapsed. However, by employing polyolefin resins, which are known in the industry as very low density polyethylene or ultra low density polyethylene, a very satisfactory flexible and collapsible product can be produced using blow molding methods. The preferred polyolefin resin is a resin that has a density (ASTM D1505) of 0.880 to 0.915 and melt indices (ASTM D1238, Condition 190/2.16) in the range of 0.10 to 5.00. Resins that meet these specifications are commercially available from Union Carbide Corporation, and are identified as Union Carbide's FLEXOMER®DFDB-1088 NT and DFDB-1085 NT. These resins are marketed by Union Carbide as blending resins intended for blending with other thermoplastics. However, when used alone in conventional blow molding techniques and without blending with a significant amount of any other thermoplastic, these very low density polyethylene and ultra low density polyethylene resins produce a product that is both flexible and collapsible so that the product can be folded up and stored, and then unfolded and expanded to return to its original shape. The product will quickly regain its original shape when unfolded, thus making the novel process very useable in producing decoys for hunting. The product produced using the principles of the invention also has high strength and is extremely durable with tear resistance ten times better than similar products produced using vacuum forming. Also, by using the blow molding process, molds with a high degree of detail can be utilized thus allowing the production of decoys that have better realism and therefore are more effective decoys. Moreover, an improved decoy product can be produced by the process of the invention at a cost at least 20% less than similar flexible and collapsible products produced using the vacuum forming process.

Although the foregoing specified resins are the preferred resins for use in the invention, ethylene vinyl acetate, which is a low density polyethylene with vinyl acetate of 6.6 to 18%, can also be used but may require special treatment if the product is to be painted satisfactorily. A resin of this type is commercially available from Quantum Chemical Corporation and is identified as NA 352005. A similar resin is available from DuPont as its Elvax 470. In addition, Phillips Petroleum Company markets a low density polyethylene resin as its Maralax® D252.

By following the principles of the invention, a vastly improved, commercially acceptable decoy product can be produced. The product can be easily collapsed and stored, and when ready for use, will readily return to its original shape. A product produced using the principles of the invention has greatly improved strength and can be produced with greatly improved realistic detail, thus producing the realism desired by hunters in decoys. In spite of all of these advantages, the product can be produced at a lower cost, thus providing a greater value to the customer. The invention has been described with certain specific resins having certain properties. However, it will be evident to those skilled in the art that other suitable resins may become commercially available and useable when the principles of the invention are applied. Although the invention has been described in connection with the production of decoys for hunting game, it should be recognized that the invention is not limited to this particular product but can be applied to any application where a lightweight, collapsible product is desired. For example, the process could be used for producing any kind of mannequins used in the display of clothing.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is:

1. A method for producing hollow and collapsible decoys which have relaxed-state and collapsed-state shapes and naturally tend to return to their relaxed-state shape when not in the collapsed-state shape, said method comprising:

providing a mold containing a mold cavity, said mold cavity having the configuration of the decoy to be produced;

preparing a mixture containing substantially all ultra low density polyethylene;

heating and mixture to be predetermined temperature where the mixture is in a liquid state;

passing the heated liquid mixture through a die to form a hollow tube;

closing the mold around the tube;

injecting air into said hollow tube to force said mixture into the configuration of said mold cavity; and closing and cooling said mold to solidify the mixture and form said decoy.

2. The method of claim 1 for producing hollow and collapsible decoys in which the ultra low density polyethylene has a density of about 0.88 to 0.90 g/cc and melt indices in the range of about 0.10 to about 5.00.

3. A method for producing hollow and collapsible decoys which have relaxed-state and collapsed-state shapes and which naturally tend to return to the relaxed-state when not in the collapsed-state shapes, said method comprising:

providing a mold containing a mold cavity, said mold cavity having the configuration of the decoy to be produced;

preparing a mixture containing ethylene vinyl acetate with about 6.6% to 18% vinyl acetate;

heating said mixture to a predetermined temperature where the mixture is in a liquid state;

passing the heated liquid mixture through a die to form a hollow tube;

closing the mold around the tube;

injecting air into said hollow tube to force said mixture into the configuration of said mold cavity; and closing and cooling said mold to solidify the mixture and form said decoy.

* * * * *